US011579799B2

(12) United States Patent
Ish et al.

(10) Patent No.: US 11,579,799 B2
(45) Date of Patent: Feb. 14, 2023

(54) DYNAMIC SELECTION OF CORES FOR PROCESSING RESPONSES

(71) Applicant: Micron Technology, Inc., Boise, ID (US)

(72) Inventors: Mark Ish, San Ramon, CA (US); Yun Li, Fremont, CA (US); Scheheresade Virani, Frisco, TX (US); John Paul Traver, Boise, ID (US); Ning Zhao, Milpitas, CA (US)

(73) Assignee: Micron Technology, Inc., Boise, ID (US)

( * ) Notice: Subject to any disclaimer, the term of this patent is extended or adjusted under 35 U.S.C. 154(b) by 28 days.

(21) Appl. No.: 16/822,916

(22) Filed: Mar. 18, 2020

(65) Prior Publication Data

US 2021/0294522 A1   Sep. 23, 2021

(51) Int. Cl.
*G06F 3/06* (2006.01)
*G06F 9/50* (2006.01)

(52) U.S. Cl.
CPC .......... *G06F 3/0659* (2013.01); *G06F 3/0604* (2013.01); *G06F 3/0673* (2013.01); *G06F 9/5027* (2013.01)

(58) Field of Classification Search
None
See application file for complete search history.

(56) References Cited

U.S. PATENT DOCUMENTS

| | | | | |
|---|---|---|---|---|
| 9,293,225 | B2* | 3/2016 | Jeon | G11C 29/1201 |
| 9,864,709 | B2* | 1/2018 | Vajapeyam | G06F 12/0817 |
| 10,409,511 | B1* | 9/2019 | Subbarao | G06F 3/067 |
| 10,423,568 | B2* | 9/2019 | Berman | G06F 3/0656 |
| 10,489,223 | B2* | 11/2019 | McElrath | G06F 9/5077 |
| 2013/0007349 | A1* | 1/2013 | D'Abreu | G11C 16/10 |
| | | | | 711/103 |
| 2016/0170886 | A1* | 6/2016 | Ma | G06F 12/084 |
| | | | | 711/122 |
| 2018/0088638 | A1* | 3/2018 | Nguyen | G06F 1/206 |
| 2021/0133122 | A1* | 5/2021 | Guyer | G06F 12/0835 |

* cited by examiner

*Primary Examiner* — Elias Mamo
(74) *Attorney, Agent, or Firm* — Holland & Hart LLP (57) ABSTRACT

Methods, systems, and devices for the dynamic selection of cores for processing responses are described. A memory sub-system can receive, from a host system, a read command to retrieve data. The memory sub-system can include a first core and a second core. The first core can process the read command based on receiving the read command. The first core can identify the second core for processing a read response associated with the read command. The first core can issue an internal command to retrieve the data from a memory device of the memory sub-system. The internal command can include an indication of the second core selected to process the read response.

20 Claims, 5 Drawing Sheets

DYNAMIC SELECTION OF CORES FOR PROCESSING RESPONSES

TECHNICAL FIELD

The following relates generally to a memory sub-system and more specifically to dynamic selection of cores for processing responses for a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to dynamic selection of cores for processing responses. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

Some memory sub-systems can include multiple cores to perform the various operations and functions of the memory system. Using multiple cores can increase the speed with which operations are performed by allowing forms of parallel processing. Different cores can be allocated to different types of operations. For example, a memory system or memory sub-system can include a first core for processing read operations, a second core for processing write operations, a third core for processing control operations, and a fourth core for processing error detection and/or correction operations. At various times, not all of the cores can be equally utilized and processing resources can remain idle at some cores while other cores have a backlog of operations to perform.

Aspects of the present disclosure address the above and other deficiencies through a memory sub-system that can dynamically select a processing core to handle a second portion of an access operation. For example, a first core can process a read operation received from a host system (e.g., a first portion) and a second core different than the first core can be selected to process outgoing response to the host system (e.g., a second portion) associated with a read operation. In some memory sub-systems, the same core that processes the received read command is also assigned to process and transmit the response to the read command. In the techniques described herein, a second core different than the first core can be selected to process the read response. For example, a read core can process the incoming read command and can assign a write core to process the read response, thereby freeing up processing resources of the read core to handle more read operations being received from the host system. In such techniques, portions of the same access operation can be performed by different cores, some portions of the access operation can be dynamically assigned to a core, and indicators can be exchanged that indicate the dynamically assigned core.

Such techniques can utilize processing resources to perform operations that would otherwise remain idle using traditional techniques. Such techniques can also improve the latency of performing some operations as well as improve the power consumption (e.g., reduce the power consumption) associated with performing some operations.

Features of the disclosure are initially described in the context of a computing environment as described with reference to FIG. 1. Features of the disclosure are described in the context of flow diagrams and block diagrams as described with reference to FIGS. 2-4. These and other features of the disclosure are further illustrated by and described with reference to a computer system that relates to dynamic selection of cores for processing responses as described with reference to FIG. 5.

Figure 1:
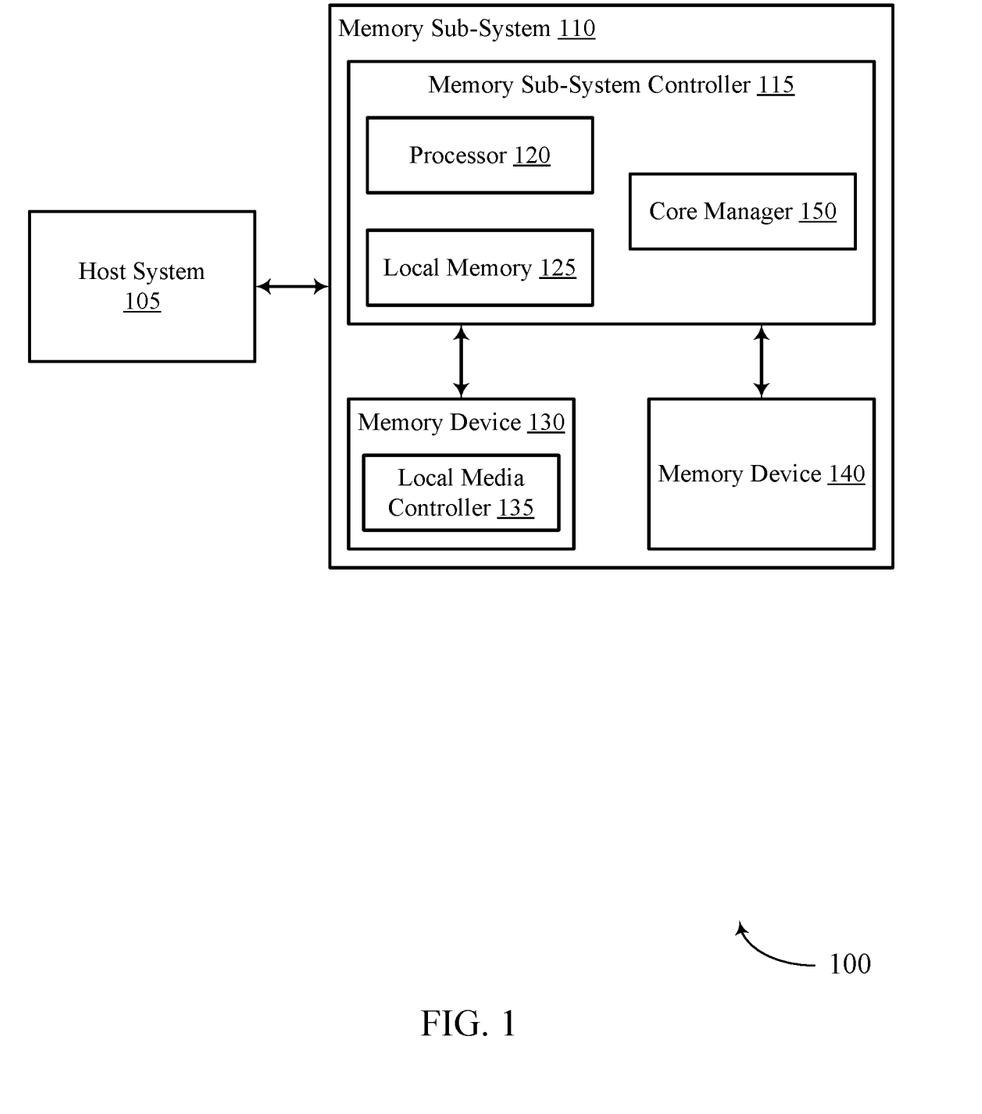
FIG. 1 illustrates an example of a computing system that includes a memory sub-system in accordance with some examples of the present disclosure.

FIG. 1 illustrates an example computing system 100 that includes a memory sub-system 110 in accordance with some embodiments of the present disclosure. The memory sub-system 110 can include media, such as one or more non-volatile memory devices (e.g., memory device(s) 130), one or more volatile memory devices (e.g., memory device(s) 140), or a combination thereof.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile DIMM (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 105 that is coupled with one or more memory sub-systems 110. In some examples, the host system 105 is coupled with different types of memory sub-systems 110. FIG. 1 illustrates one example of a host system 105 coupled with one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 105 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 105 uses the memory sub-system 110, for example, to write data to the memory sub-system 110 and read data from the memory sub-system 110.

The host system 105 can be coupled to the memory sub-system 110 using a physical host interface. Examples of a physical host interface include, but are not limited to, a serial advanced technology attachment (SATA) interface, a peripheral component interconnect express (PCIe) interface, USB interface, Fiber Channel, Small Computer System Interface (SCSI), Serial Attached SCSI (SAS), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 105 and the memory sub-system 110. The host system 105 can further utilize a non-volatile memory Express (NVMe) interface to access the components (e.g., memory device(s) 130) when the memory sub-system 110 is coupled with the host system 105 by the PCIe interface. The physical host interface can provide an interface for passing control, address, data, and other signals between the memory sub-system 110 and the host system 105. FIG. 1 illustrates a memory sub-system 110 as an example. In general, the host system 105 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device(s) 140) can be, but are not limited to, random access memory (RAM), such as dynamic RAM (DRAM) and synchronous DRAM (SDRAM).

Some examples of non-volatile memory devices (e.g., memory device(s) 130) includes a negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable ROM (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can include a processor chipset that includes one or more cores. The memory sub-system controller 115 can be a microcontroller, special purpose logic circuitry (e.g., a field programmable gate array (FPGA), an application specific integrated circuit (ASIC), a digital signal processor (DSP)), or other suitable processor.

The memory sub-system controller 115 can include a processor 120 (e.g., a processing device) configured to execute instructions stored in a local memory 125. In the illustrated example, the local memory 125 of the memory sub-system controller 115 includes an embedded memory configured to store instructions for performing various processes, operations, logic flows, and routines that control operation of the memory sub-system 110, including handling communications between the memory sub-system 110 and the host system 105.

In some examples, the local memory 125 can include memory registers storing memory pointers, fetched data, etc. The local memory 125 can also include ROM for storing micro-code. While the example memory sub-system 110 in FIG. 1 has been illustrated as including the memory sub-system controller 115, in another example of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 105 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 105 via the physical host interface. The host interface circuitry can convert the commands received from the host system into command instructions to access the memory devices 130 and/or the memory device 140 as well as convert responses associated with the memory devices 130 and/or the memory device 140 into information for the host system 105.

The memory sub-system 110 can also include additional circuitry or components that are not illustrated. In some examples, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some examples, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a core manager 150 that can handle communications between the memory sub-system 110 and the host system 105. Some memory sub-systems 110 can include more than one processing core to perform operations. For example, the memory sub-system 110 can include a first processing core to perform read operations and a second processing core to perform write operations. In some implementations, read operations can be more common to perform than write operations. In such implementations, some cores can be used more than others. To mitigate latency due to performing a large number of operations using the same processing core, the core manager 150 can be configured to dynamically select cores to perform different portions of an operation. For example, the core manager 150 can be configured to select a core for processing responses as part of a read operation that is different than a core that processed the receipt of the read command from the host system 105.

In some examples, the memory sub-system controller 115 includes at least a portion of the core manager 150. For example, the memory sub-system controller 115 can include a processor 120 (e.g., a processing device) configured to execute instructions stored in local memory 125 for performing the operations described herein. In some examples, the core manager 150 is part of the host system 105, an application, or an operating system.

The core manager 150 can dynamically select, in response to receiving a read command, a core to process a read response that is different than the core used to process the read command. By allowing the core manager 150 to dynamically select cores for portions of the access operation, the core manager 150 can reduce latency for performing portions of the read operation. In some cases, a read operation can be performed by more than one core. Further details with regards to the operations of the core manager 150 are described below.

Figure 2:
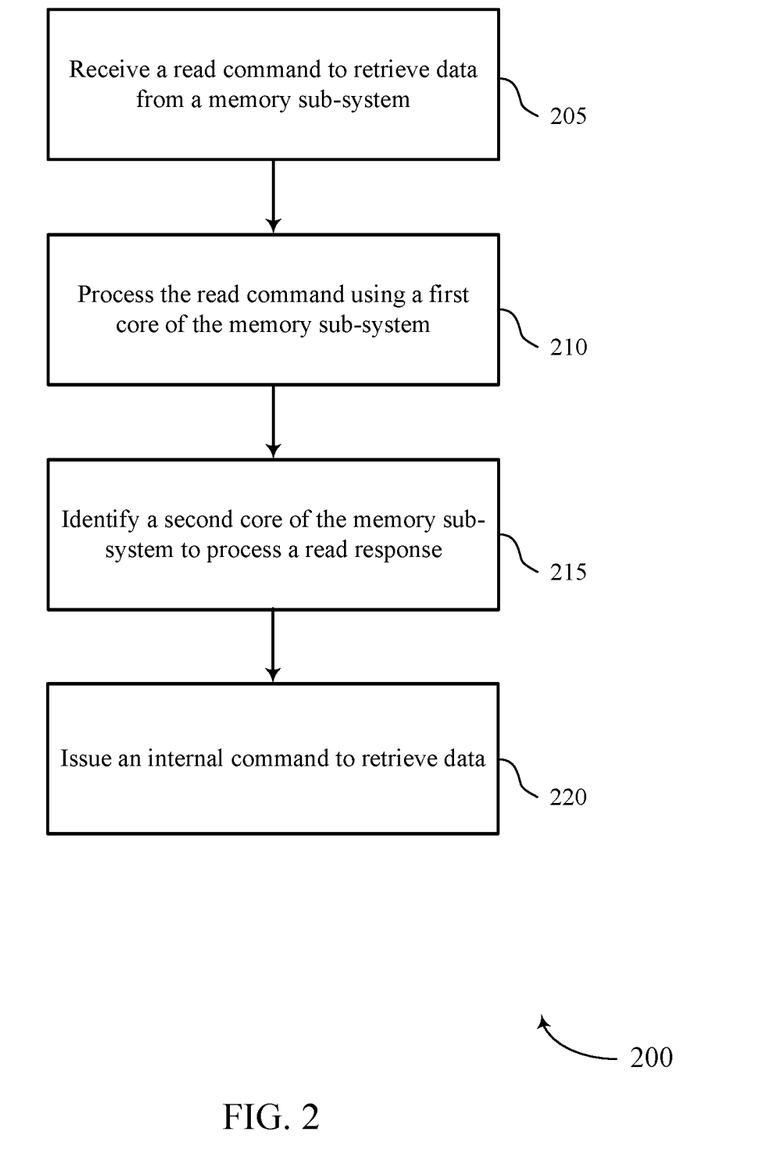
FIG. 2 is a flow diagram of an example method for dynamic selection of cores for processing responses in accordance with some examples of the present disclosure.

FIG. 2 is a flow diagram of an example method 200 to dynamic selection of cores for processing responses in accordance with some examples of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some examples, the method 200 is performed by the core manager 150 of FIG. 1. Although shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every example. Other process flows are possible.

At operation 205, the memory sub-system can receive access commands from a host system. Such access commands can be read commands, write commands, or erase commands which can read, erase, write, and/or re-write data specific to memory cells in memory devices of the memory sub-system. In some cases, the access commands can cause the memory sub-system to retrieve data from a memory device to be used by the host system. In some examples, each read command includes an instruction to read one or more of the blocks of data at a respective source address of the memory subsystem.

At operation 210, the memory sub-system can process an access command using a first core of the memory sub-system. The first core can be associated with a frontend portion of the firmware, such that the first core is used to perform functions related to the frontend manager of the firmware. The frontend manager of the firmware can be configured to interface with the host system. In some examples, the first core can be an example of a read core, or a processing core used to process read operations. The first core of the frontend of the memory sub-system can receive a read command to retrieve data from the host system. In some examples, the read command can correspond to accessing a first core of the frontend manager within the memory sub-system.

At operation 215, the first core of the memory sub-system can identify or select a second core of the memory sub-system for processing a read response. The second core can be associated with a frontend portion of the firmware, such that the first core is used to perform functions related to the frontend manager of the firmware. In some examples, the second core can be an example of a write core, or a processing core used to process write operations. In some examples, the identified second core that processes the read response can be different than the first core. In other examples, the identified second core that processes the read response can be the same as the first core. In other cases, the first core and second core can be an example of one or more cores working together. Additionally or alternatively, one core or multiple cores can be queried by the first core that processes the received read command. Once one or multiple cores are queried, the first core can delegate portions of the read operation to the one or multiple cores to be performed. The core that is chosen to process the second portion of the access command can be dynamically selected.

At operation 220, the first core of the memory sub-system can issue an internal command to retrieve data. In some examples, the internal command can include an indication of the second core identified to process the read response. The backend manager can receive the internal command, cause the requested data to be retrieved from the memory device, and can issue a second internal command that the requested data is ready to be sent to the host system. The second internal command can be sent to the second core identified in the internal command or the second internal command can include an indication of the second core identified to process the read response. The second core can process the requested data and/or the second internal command to generate a read response. The second core can transmit the read response based on the generating.

Figure 3:
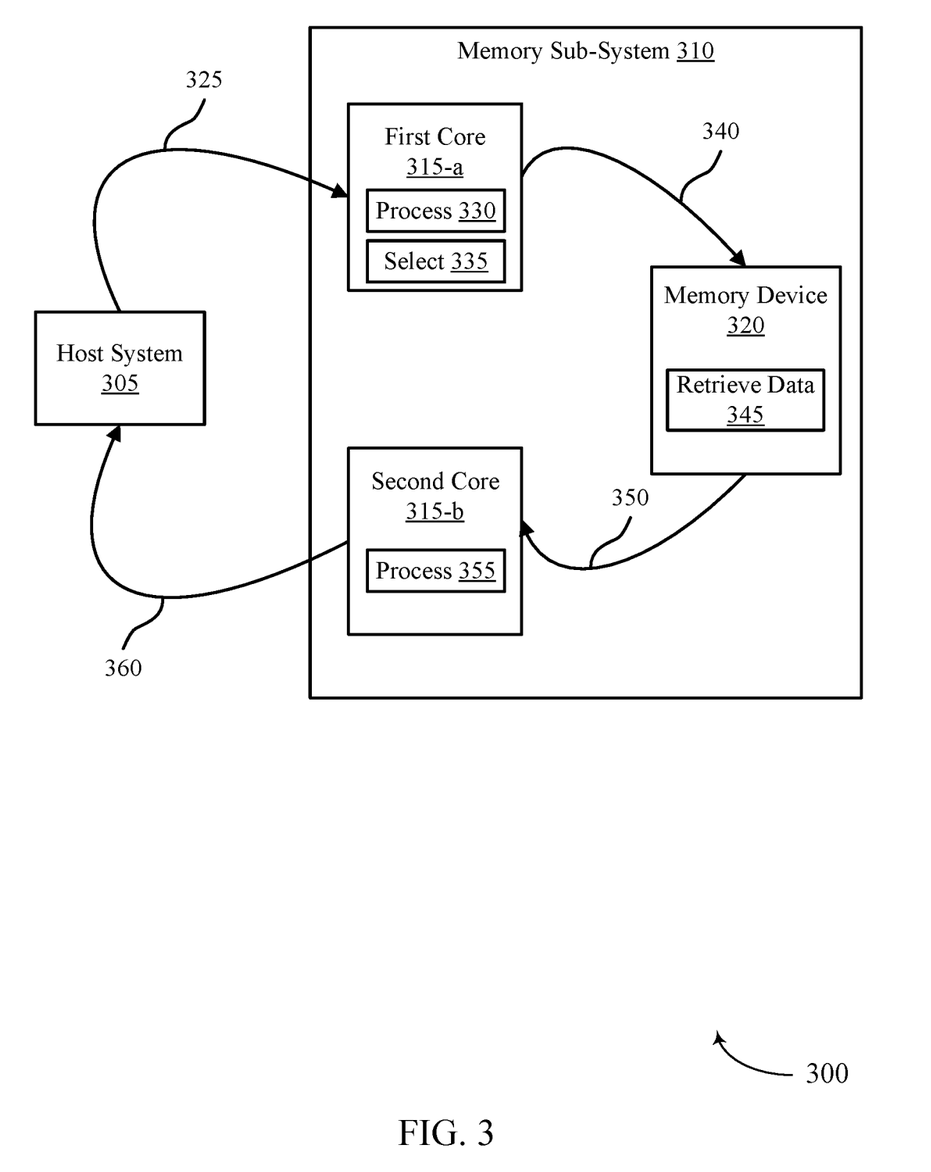
FIG. 3 is a block diagram of an example system for dynamic selection of cores for processing responses in accordance with some examples of the present disclosure.

FIG. 3 illustrates an example of a system 300 for dynamic selection of cores for processing responses in accordance with examples as disclosed herein. The system 300 can include a host system 305 in communication with a memory sub-system 310. The host system 305 can be an example of the host system 105 described with reference to FIG. 1. The memory sub-system 310 can be an example of the memory sub-system 110 described with reference to FIG. 1. The components of the memory sub-system 310 can receive and transmit communications associated with a read operation.

The read operation can be partitioned into one or more portions and each portion can be performed by a different processing core. For example, a first portion of the read operation can relate to processing the read command by a frontend manager, a second portion of the read operation can relate to retrieving data from a memory device by a backend manager and/or memory device components, and a third portion can relate to the processing the read response and transmitting the read response to the host system 305 by the frontend manager. The portions of the read operation can be performed by one or more processing cores associated with the various managers and/or devices. Information processed by one or more processing cores associated with the frontend manager can be directed to one or more processing cores associated with the backend manager through one or more processing cores associated with a flash translation manager. Additional details about processing cores of the various manager is described with reference to FIG. 4.

The system 300 can include host system 305 in communication with memory sub-system 310. Memory sub-system 310 can include first core 315-a, second core 315-b, and a memory device 320. First core 315-a and second core 315-b of memory sub-system 310 can be examples of processing cores associated with a frontend manager of the memory sub-system 310. The memory sub-system 310 can include firmware that includes a frontend manager (e.g., a frontend layer), a translation manager (e.g., a flash translation layer), and a backend manager, each being associated with processing cores.

The host system 305 can issue an access command 325 (e.g., a read command, write command, or other type of command) to retrieve data from memory sub-system 310. Memory sub-system 310 can receive the access command 325 to retrieve data from the memory device 320 on behalf of the host system 305.

The access command 325, once received by memory sub-system 310, can be processed by first core 315-a at operation 330. When processing the access command 325, the first core 315 can identify the type of the access command 325 received from the host system 305 or identify one or more parameters of the access command 325.

At operation 335, the first core 315-a can select a processing core to handle at least a portion of the access operation (e.g., a read operation). For example, the first core 315-a can select a processing core to process and/or transmit a response 360 (e.g., a read response) of the access operation. As described with more detail with reference to FIG. 4, the memory sub-system 310 can have any number of cores 315. The first core 315-a can represent the processing core used to process a received access command (e.g., read command). The second core 315-b can represent the processing core used to process a response to the access command (e.g., a read response).

By selecting a processing core to handle portions of the access operation, processing resources can be more efficiently used or allocated. For example, the first core 315-a can be an example of a read core configured to perform functions of read operations and the second core 315-b can be an example of a write core configured to perform functions of write operations. After receiving a read command (e.g., access command 325), the write core (e.g., the second core 315-b) can be relatively idle (or underutilized for a duration of time), as compared with the read core (e.g., the first core 315-a). To mitigate bottlenecks at the read core, portions of the read operations can be offloaded to other cores, such as the write core.

After selecting the second core 315-b that is to process the response to the access command 325, the first core 315-a can issue a first internal command 340 to memory device 320 (through the backend manager) to retrieve the data requested by the access command 325. The first internal command 340 can include information regarding the selected second core 315-b. For example, the first internal command 340 can include an indicator that identifies which processing core has been selected as the second core 315-b to process the response 360. In some embodiments, the first core 315-a can select a different core to process the response 360, in which case the second core 315-b represents a different core than the first core 315-a. In some embodiments, the first core 315-a can select itself to process the response 360, in which case the second core 315-b represents the same core as the first core 315-a.

In some examples, as part of selecting the processing core to process the response 360, the first core 315-a can query one or more cores to determine a utilization of the one or more cores. The other cores can respond to the query with utilization information related to the usage of each core over a duration of time. The first core 315-a can use the utilization information to select which core is to act as the second core 315-b and process the response 360.

Upon receiving the first internal command 340, the memory device 320 can retrieve the requested data from one or more memory cells included in the memory device 320. For example, at operation 345, the memory device 320 can retrieve the data to be sent as part of the response 360. The memory device 320 can perform an operation in response to receiving the internal command. The memory device 320, in some cases, can identify the second core 315-b selected to process the response 360. The memory device 320 can issue a second internal command 350 to the dynamically selected core (e.g., the second core 315-b) based on completing the internal operation initiated by the first internal command 340. In some cases, the second internal command 350 can include the data retrieved from memory device 320. In some cases, the second internal command 350 can include an indicator of the dynamically selected core (e.g., the second core 315-*b*).

The second core 315-*b* of the memory sub-system 310 can process the response 360, at operation 355, based on receiving the second internal command 350. The second core 315-*b* can identify the data included in the second internal command 350, the identified data can include control information or data retrieved from the memory cells, and can generate a response 360 to transmit to the host system 305. For example, when the access command 325 is a read command, the second core 315-*b* can generate a read response using the data retrieved from the memory device 320. The second core 315-*b* can transmit the response 360 to host system 305. The second internal command 350 can be sent directly to the second core 315-*b* selected for processing the response 360. The second internal command 350 can be sent to a queue with the indication of the second core 315-*b* selected for processing the response 360. Processing cores can query the queues and the assigned processing core can be configured to execute the operations included in the queue.

Figure 4:
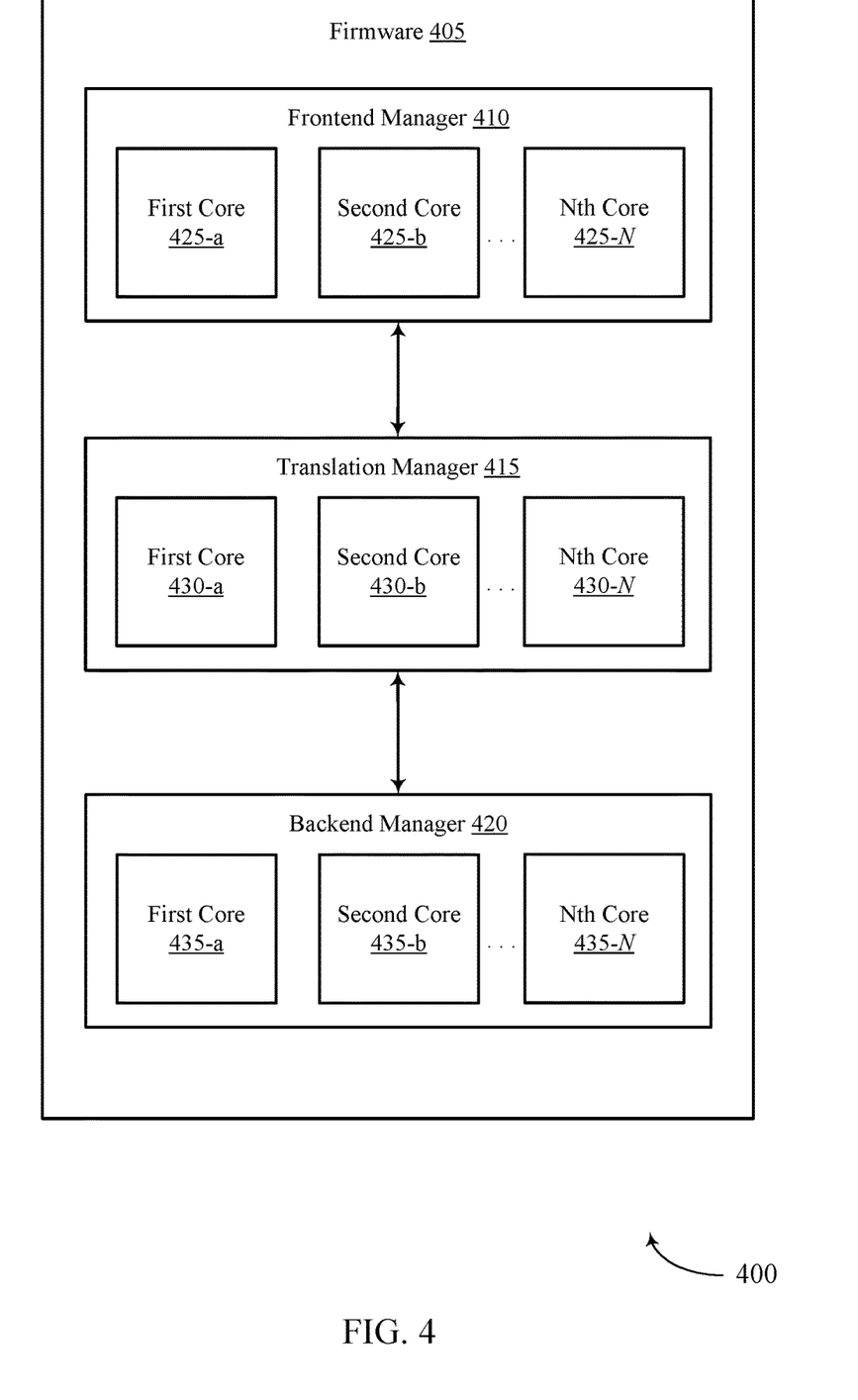
FIG. 4 is a block diagram of an example memory sub-system for dynamic selection of cores for processing responses in accordance with some examples of the present disclosure.

FIG. 4 illustrates an example of memory sub-system 400 for dynamic selection of cores for processing responses in accordance with examples as disclosed herein. A memory sub-system can include firmware 405. The firmware 405 can include a frontend manager 410 (sometimes referred to as a frontend layer), a translation manager 415 (sometimes referred to as a flash translation layer or FTL), and a backend manager 420 (sometimes referred to as a backend layer). A core may be an example of a processor (e.g., processor 120), one or more portions of a processor, a processing device (e.g., processing device 505), one or more portions of a processing device, or combinations thereof, as described herein. A core may be any circuit, processor, hardware, or device configured to execute one or more instructions to perform one or more operations.

Frontend manager 410 can be configured as an interface between the host system and the memory sub-system. For example, the frontend manager 410 can be configured to receive, process, and/or interpret commands and other communications received from the host system and transmitted to the host system. One or more cores 425 can be used to perform the functions of the frontend manager 410. For example, a first core 425-*a*, a second core 425-*b*, and an Nth core 425-N can be used to implement the functions of the frontend manager 410. In some embodiments, these cores 425 can be dedicated to performing the functions of the frontend manager 410. In some embodiments, one or more these cores 425 can be used to perform the functions of the frontend manager 410, the translation manager 415, or the backend manager 420, or combinations thereof. N can represent any positive integer of cores.

Backend manager 420 can be configured as an interface between the memory sub-system and the memory device of the memory sub-system. For example, the backend manager 420 can be configured to receive, process, and/or interpret data and other communications received from the memory device and transmitted to the memory device. One or more cores 435 can be used to perform the functions of the backend manager 420. For example, a first core 435-*a*, a second core 435-*b*, and an Nth core 435-N can be used to implement the functions of the backend manager 420. In some embodiments, these cores 435 can be dedicated to performing the functions of the backend manager 420. In some embodiments, one or more these cores 435 can be used to perform the functions of the frontend manager 410, the translation manager 415, or the backend manager 420, or combinations thereof. N can represent any positive integer of cores.

Translation manager 415 can be configured as an interface between the frontend manager 410 and the backend manager 420. In some implementations, the commands and signaling scheme used by the host system can be different than the command and signaling scheme used by the memory device. To facilitate communications between the host system and the memory device that stores data on behalf of the host system, the translation manager 415 can translate or otherwise convert host system information to memory device information and vice-versa. One or more cores 430 can be used to perform the functions of the translation manager 415. For example, a first core 430-*a*, a second core 430-*b*, and an Nth core 430-N can be used to implement the functions of the translation manager 415. In some embodiments, these cores 430 can be dedicated to performing the functions of the translation manager 415. In some embodiments, one or more these cores 430 can be used to perform the functions of the translation manager 415, the translation manager 415, or the backend manager 420, or combinations thereof. N can represent any positive integer of cores.

The first core 315-*a* and the second core 315-*b* described with reference to FIG. 3 can be examples of the cores 425 of the frontend manager 410. In such examples, the first core 315-*a* that processes the access command can be any of the Nth cores 425-N and the second core that processes the response can be any of the Nth cores 425-N. In some instances, the first core 425-*a* of the frontend manager 410 can perform a first portion of a read operation (e.g., processing the received access command). A second portion of the read operation to retrieve data or otherwise execute the access operation can be performed by one or more cores 430 of the translation manager 415, one or more cores 435 of the backend manager 420, the memory device, or combinations thereof. For example, one or more cores 430 and one or more cores 435 can be used to execute a command based on a core 425 issuing an internal command. The second core 425-*b* of the frontend manager 410 can perform a third portion of the read operation (e.g., processing the response).

Figure 5:
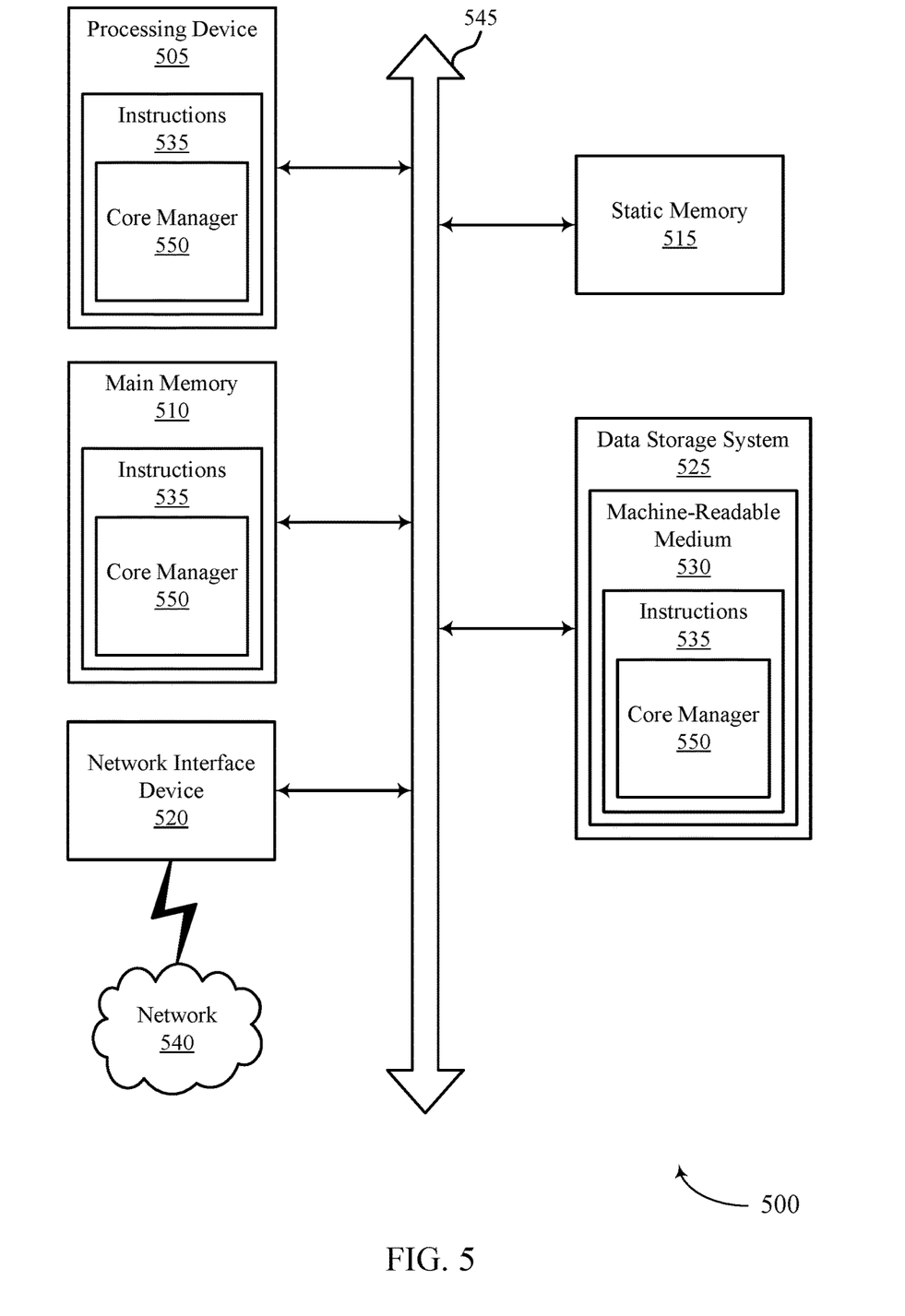
FIG. 5 is a block diagram of an example computer system in which examples of the present disclosure can operate.

FIG. 5 illustrates an example machine of a computer system 500 that supports a folding scoreboard for maintaining sequentiality in accordance with examples as disclosed herein. The computer system 500 can include a set of instructions, for causing the machine to perform any one or more of the techniques described herein. In some examples, the computer system 500 can correspond to a host system (e.g., the host system 105 described with reference to FIG. 1) that includes, is coupled with, or utilizes a memory sub-system (e.g., the memory sub-system 110 described with reference to FIG. 1) or can be used to perform the operations of a controller (e.g., to execute an operating system to perform operations corresponding to the core manager 150 described with reference to FIG. 1). In some examples, the machine can be connected (e.g., networked) with other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" can also include any collection of machines that individually or jointly execute a set (or multiple sets) of instructions to perform any one or more of the methodologies discussed herein.

The example computer system 500 can include a processing device 505, a main memory 510 (e.g., ROM, flash memory, DRAM such as SDRAM or Rambus DRAM (RDRAM), etc.), a static memory 515 (e.g., flash memory, static RAM (SRAM), etc.), and a data storage system 525, which communicate with each other via a bus 545.

Processing device 505 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 505 can also be one or more special-purpose processing devices such as an ASIC, an FPGA, a DSP, network processor, or the like. The processing device 505 is configured to execute instructions 535 for performing the operations and steps discussed herein. The computer system 500 can further include a network interface device 520 to communicate over the network 540.

The data storage system 525 can include a machine-readable storage medium 530 (also known as a computer-readable medium) on which is stored one or more sets of instructions 535 or software embodying any one or more of the methodologies or functions described herein. The instructions 535 can also reside, completely or at least partially, within the main memory 510 and/or within the processing device 505 during execution thereof by the computer system 500, the main memory 510 and the processing device 505 also constituting machine-readable storage media. The machine-readable storage medium 530, data storage system 525, and/or main memory 510 can correspond to a memory sub-system.

In one example, the instructions 535 include instructions to implement functionality corresponding to a core manager 550 (e.g., the core manager 150 described with reference to FIG. 1). While the machine-readable storage medium 530 is shown as a single medium, the term "machine-readable storage medium" can include a single medium or multiple media that store the one or more sets of instructions. The term "machine-readable storage medium" can also include any medium that is capable of storing or encoding a set of instructions for execution by the machine and that cause the machine to perform any one or more of the methodologies of the present disclosure. The term "machine-readable storage medium" can include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some examples, a machine-readable (e.g., computer-readable) medium includes a machine (e.g., a computer) readable storage medium such as ROM, RAM, magnetic disk storage media, optical storage media, flash memory components, etc.

In the foregoing specification, examples of the disclosure have been described with reference to specific example examples thereof. It will be evident that various modifications can be made thereto without departing from the broader spirit and scope of examples of the disclosure as set forth in the following claims. The specification and drawings are, accordingly, to be regarded in an illustrative sense rather than a restrictive sense.

What is claimed is:

1. A method, comprising:
 receiving, from a host system, a read command to retrieve data from a memory sub-system;

processing, using a first core of the memory sub-system, the read command based at least in part on receiving the read command;

identifying, by the first core, a second core of the memory sub-system for processing and transmitting a read response associated with the read command to the host system based at least in part on querying, by the first core, a utilization of a plurality of cores; and issuing, by the first core, an internal command to retrieve the data from a memory device of the memory sub-system, the internal command including an indication of the second core selected to process and transmit the read response to the host system.

2. The method of claim 1, further comprising:

transmitting, by the second core to the host system, the read response based at least in part on issuing the internal command, the read response including the data indicated in the read command.

3. The method of claim 2, further comprising:

retrieving the data requested by the read command from the memory device based at least in part on issuing the internal command; and issuing, to the second core, a second internal command to transmit the read response with the data.

4. The method of claim 3, further comprising:

identifying the second core included in the internal command, wherein issuing the second internal command is based at least in part on identifying the second core included in the internal command.

5. The method of claim 1, further comprising:

identifying that the second core is allocated for processing one or more write commands, wherein identifying the second core is based at least in part on identifying that the second core is allocated for processing the one or more write commands.

6. The method of claim 1, further comprising:

querying, by the first core, a utilization of the plurality of cores, the plurality of cores comprising the second core, wherein identifying the second core is based at least in part on querying the utilization of the plurality of cores; and selecting, by the first core, a core of the plurality of cores to operate as the second core based at least in part on querying the utilization of the plurality of cores.

7. The method of claim 1, wherein a first portion of a read operation is performed by the first core and a second portion of the read operation is performed by the second core.

8. The method of claim 1, wherein the first core is different than the second core.

9. The method of claim 1, wherein the first core comprises the second core.

10. The method of claim 1, wherein a core for transmitting the read response is configurable by the first core from a plurality of cores of the memory sub-system.

11. A system, comprising:

a plurality of memory components; and a processing device, operatively coupled with the plurality of memory components, to:

receive, from a host system, a read command to retrieve data from a memory sub-system;

process, using a first core of the memory sub-system, the read command based at least in part on receiving the read command;

identify, by the first core, a second core of the memory sub-system for processing and transmitting a read response associated with the read command to the host system based at least in part on querying, by the first core, a utilization of a plurality of cores; and issue, by the first core, an internal command to retrieve the data from a memory device of the memory sub-system, the internal command including an indication of the second core selected to process and transmit the read response to the host system.

12. The system of claim 11, wherein the processing device is to:

transmit, by the second core to the host system, the read response based at least in part on issuing the internal command, the read response including the data indicated in the read command.

13. The system of claim 12, wherein the processing device is to:

retrieve the data requested by the read command from the memory device based at least in part on issuing the internal command; and issue, to the second core, a second internal command to transmit the read response with the data.

14. The system of claim 13, wherein the processing device is to:

identify the second core included in the internal command, wherein issuing the second internal command is based at least in part on identifying the second core included in the internal command.

15. The system of claim 11, wherein the processing device is to:

identify that the second core is allocated for processing one or more write commands, wherein identifying the second core is based at least in part on identifying that the second core is allocated for processing the one or more write commands.

16. The system of claim 11, wherein the processing device is to:

query, by the first core, a utilization of the plurality of cores, the plurality of cores comprising the second core, wherein identifying the second core is based at least in part on querying the utilization of the plurality of cores; and select, by the first core, a core of the plurality of cores to operate as the second core based at least in part on querying the utilization of the plurality of cores.

17. A non-transitory computer-readable medium storing code for wireless communication, the code comprising instructions executable by a processor to:

receive, from a host system, a read command to retrieve data from a memory sub-system;

process, using a first core of the memory sub-system, the read command based at least in part on receiving the read command;

identify, by the first core, a second core of the memory sub-system for processing and transmitting a read response associated with the read command to the host system based at least in part on querying, by the first core, a utilization of a plurality of cores; and issue, by the first core, an internal command to retrieve the data from a memory device of the memory sub-system, the internal command including an indication of the second core selected to process and transmit the read response to the host system.

18. The non-transitory computer-readable medium of claim 17, the code comprising instructions executable by the processor to:

transmit, by the second core to the host system, the read response based at least in part on issuing the internal command, the read response including the data indicated in the read command.

19. The non-transitory computer-readable medium of claim 18, the code comprising instructions executable by the processor to:
retrieve the data requested by the read command from the memory device based at least in part on issuing the internal command; and
issue, to the second core, a second internal command to transmit the read response with the data.

20. The non-transitory computer-readable medium of claim 19, the code comprising instructions executable by the processor to:
identify the second core included in the internal command, wherein issuing the second internal command is based at least in part on identifying the second core included in the internal command.

* * * * *